(12) United States Patent
Kim et al.

(10) Patent No.: US 8,174,660 B2
(45) Date of Patent: May 8, 2012

(54) METAL LINE, METHOD OF FORMING THE SAME, AND A DISPLAY USING THE SAME

(75) Inventors: Sung Ryul Kim, Cheonan-si (KR); Yong-Mo Choi, Osan-si (KR); Sung-Hoon Yang, Seoul (KR); Hwa-Yeul Oh, Seoul (KR); Kap-Soo Yoon, Seoul (KR); Jae-Ho Choi, Seoul (KR); Seong-Hun Kim, Seoul (KR)

(73) Assignee: Samsung Electronics Co., Ltd. (KR)

( * ) Notice: Subject to any disclaimer, the term of this patent is extended or adjusted under 35 U.S.C. 154(b) by 384 days.

(21) Appl. No.: 12/332,249

(22) Filed: Dec. 10, 2008

(65) Prior Publication Data
US 2009/0185126 A1    Jul. 23, 2009

(30) Foreign Application Priority Data

Jan. 22, 2008    (KR) .................. 10-2008-0006698

(51) Int. Cl.
*G02F 1/1343*    (2006.01)
(52) U.S. Cl. ...................... 349/147; 349/148
(58) Field of Classification Search ............ 349/147, 349/148
See application file for complete search history.

(56) References Cited

U.S. PATENT DOCUMENTS

| | | | |
|---|---|---|---|
| 6,165,917 A * | 12/2000 | Batey et al. | 438/792 |
| 7,253,041 B2 * | 8/2007 | Gan et al. | 438/158 |
| 2006/0225783 A1 * | 10/2006 | Iwanaga | 136/263 |
| 2006/0226517 A1 * | 10/2006 | Iwanaga et al. | 257/639 |
| 2010/0237355 A1 * | 9/2010 | Moriguchi et al. | 257/72 |

FOREIGN PATENT DOCUMENTS

| | | |
|---|---|---|
| JP | 2001-176878 | 6/2001 |
| JP | 2001-196371 | 7/2001 |
| KR | 1020020017435 A | 3/2002 |

* cited by examiner

*Primary Examiner* — Rhonda Peace
(74) *Attorney, Agent, or Firm* — Innovation Counsel LLP

(57) ABSTRACT

Provided are a metal line, a method of forming the same, and a display using the same. To increase resistance of a metal line having a multilayered structure of CuO/Cu and prevent blister formation, a plasma treatment is performed using a nitrogen-containing gas and a silicon-containing gas or using a hydrogen or argon as and the silicon-containing gas. Accordingly, a plasma treatment layer such as a SiNx or Si layer is thinly formed on the copper layer, thereby preventing an increase in resistance of the copper layer and also preventing blister formation caused by the damage of a copper oxide layer. Consequently, it is possible to improve the reliability of a copper line and thus enhance the reliability of a device.

17 Claims, 7 Drawing Sheets
(2 of 7 Drawing Sheet(s) Filed in Color)

METAL LINE, METHOD OF FORMING THE SAME, AND A DISPLAY USING THE SAME

CROSS-REFERENCE TO RELATED APPLICATION

This application claims priority to Korean Patent Application No. 10-2008-0006698 filed on Jan. 22, 2008, and all the benefits accruing therefrom under 35 U.S.C. §119, the contents of which are incorporated by reference in their entirety.

BACKGROUND

The present disclosure relates to a metal line, and more particularly, to a metal line, a method of forming the metal line, and a display using the metal line, which can prevent an increase in resistance of a copper line.

A liquid crystal display (LCD), which is one type of flat display, includes a lower substrate having a gate line, a data line, a pixel electrode, a TFT, and the like, an upper substrate having a common electrode, and the like, and a liquid crystal layer disposed between the lower and upper substrates. In the LCD, a voltage is applied to the pixel electrode and the common electrode to generate an electric field across the liquid crystal layer, thus changing the orientation of the liquid crystal molecules of the liquid crystal layer. Therefore, the LCD displays an image by using such a change in orientation of the liquid crystal molecules and controlling the polarization of incident light.

To realize an LCD with high resolution in a large size, it is essentially required to reduce line resistance of a gate line or the like. For this reason, a metal line such as a gate line is formed of a low resistance material, for example, copper (Cu) or silver (Ag). Copper has a specific resistance ranging from 2.1 $\mu\Omega$cm to 2.3 $\mu\Omega$cm in a thin film state, which is about 30% lower than a specific resistance (3.1 $\mu\Omega$cm) of aluminum that is being widely used for a metal line. In addition, copper has a better electromigration resistance characteristic than aluminum so that copper exhibits good resistance against the formation of hillocks. Therefore, much attention is being paid on copper as a material for a metal line of a next generation device. However, copper has relatively poor adhesiveness with glass, and relatively good reactivity with silicon. Accordingly, before the formation of copper, an adhesion layer should be formed first or, alternatively, an adhesion layer and a diffusion barrier layer should be formed over and under the copper. Up to now, as a metal line structure of an LCD using a copper line, there has been proposed a bilayered metal line structure using an adhesive layer, for example, a bilayered structure of Mo/Cu, Mo—Ti/Cu, MoW/Cu or MoCr/Cu containing molybdenum (Mo) or Mo alloy. Alternatively, there has been also announced a trilayered structure using an adhesion layer and a diffusion barrier layer, for example, Mo/Cu/Mo or Mo/Cu/MoN.

In order to form an adhesion layer of Mo or Mo alloy, a process of forming the adhesion layer should be additionally performed besides a copper forming process, thus requiring an additional process apparatus. This leads to an increase in process time and a difficulty in wet etching. Hence, to reduce the process time and facilitate the wet etching, a stacked structure of CuO/Cu was recently proposed, in which a copper oxide (CuO) layer is formed under a Cu layer. This CuO/Cu stacked structure is advantageous in that a process time may be reduced and the wet etching may be easily performed because Cu and CuO layers are successively formed in the same apparatus.

Further, if a diffusion barrier layer is formed on the copper layer, the copper layer is not exposed so that it is possible to prevent an increase in resistance of the copper layer. In this case, however, another layer should be additionally formed besides the copper layer, thus requiring an additional process apparatus and increasing a process time.

SUMMARY

The present disclosure provides a metal line, a method of forming the metal line, and a display using the metal line, which can prevent an increase in resistance of a copper layer and formation of defects.

The present disclosure also provides a metal line, a method of forming the metal line, and a display using the metal line, which can prevent blister formation through a plasma treatment by adding a silicon-containing gas and also prevent an increase in resistance of a copper layer by forming a plasma treatment layer over the copper layer.

In accordance with an exemplary embodiment, a metal line comprises: a copper oxide layer and a copper layer, which are stacked in sequence; and a plasma treatment layer formed on the copper layer through a plasma treatment using a process gas including a silicon-containing gas. The following additional description outlines several possible alternative embodiments:

The plasma treatment layer may also comprise at least one of a silicon nitride layer and a silicon layer.

The silicon nitride layer may have a refractive index ranging from approximately 1.70 to approximately 1.80, and a dielectric constant ranging from approximately 5.0 to approximately 6.0. The silicon nitride layer may have a ratio of nitrogen to silicon ranging from approximately 0.8 to approximately 1.4, and a ratio of N—H bond to Si—H bond ranging from approximately 30 to approximately 45.

The metal line may have a specific resistance ranging from approximately 1.7 $\mu\Omega$cm to approximately 2.3 $\mu\Omega$cm.

The copper oxide layer may have a thickness of approximately 1/10 to approximately 1/30 the thickness of the copper layer, and the plasma treatment layer may have a thickness of approximately 1/6 to approximately the same thickness of the copper oxide layer.

In accordance with another exemplary embodiment, a method of forming a metal line comprises: forming a copper oxide layer and a copper layer on a substrate sequentially; and forming a plasma treatment layer on the copper layer through a plasma treatment using a process gas comprising a silicon-containing gas.

The copper oxide layer and the copper layer may be successively formed in the same apparatus.

The plasma treatment layer may comprise at least one of a silicon nitride layer and a silicon layer.

The silicon nitride layer may be formed by a plasma treatment using a nitrogen-containing gas and a silicon-containing gas.

The nitrogen-containing gas and the silicon-containing gas may have introduced at a ratio of approximately 8:1 to approximately 40:1.

The silicon layer may be formed by a plasma treatment using a hydrogen or argon gas and a silicon-containing gas.

In accordance with yet another exemplary embodiment, a display comprises: a plurality of gate lines extending in one direction over a substrate, and having a copper oxide layer and a copper layer stacked in sequence; a plasma treatment layer and a gate dielectric layer provided over the substrate comprising the gate lines; a plurality of data lines extending in another direction crossing the gate lines; and a pixel electrode electrically connected to the gate line and the data line.

The plasma treatment layer may comprise at least one of a silicon nitride layer and a silicon layer.

The silicon nitride layer may have a refractive index ranging from approximately 1.70 to approximately 1.80, and a dielectric constant ranging from approximately 5.0 to approximately 6.0. The silicon nitride layer may have a ratio of nitrogen to silicon ranging from approximately 0.8 to approximately 1.4, and a ratio of N—H bond to Si—H bond ranging from approximately 30 to approximately 45.

The metal line may have a specific resistance ranging from approximately 1.7 μΩcm to approximately 2.3 μΩcm.

BRIEF DESCRIPTION OF THE DRAWINGS

The patent or application file contains at least one drawing executed in color. Copies of this patent or patent application publication with color drawings will be provided by the U.S. Patent and Trademark Office upon request and payment of the necessary fee. Exemplary embodiments can be understood in more detail from the following description taken in conjunction with the accompanying drawings, in which.

DETAILED DESCRIPTION OF EMBODIMENTS

Figure 1A:
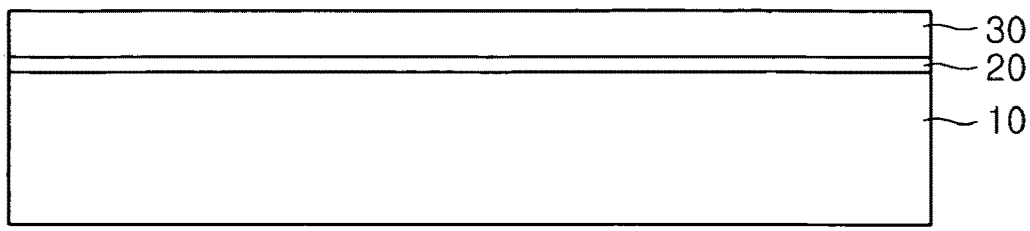
FIGS. 1A through 1C are cross-sectional views illustrating a method of forming a metal line in accordance with an exemplary embodiment.

Hereinafter, specific embodiments will be described in detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. In the figures, the dimensions of layers and regions are exaggerated for clarity of illustration. Like reference numerals refer to like elements throughout. It will also be understood that when a layer, a film, a region or a plate is referred to as being 'on' another one, it can be directly on the other one, or one or more intervening layers, films, regions or plates may also be present. Further, it will be understood that when a layer, a film, a region or a plate is referred to as being 'under' another one, it can be directly under the other one, and one or more intervening layers, films, regions or plates may also be present. In addition, it will also be understood that when a layer, a film, a region or a plate is referred to as being 'between' two layers, films, regions or plates, it can be the only layer, film, region or plate between the two layers, films, regions or plates, or one or more intervening layers, films, regions or plates may also be present.

Figure 1B:
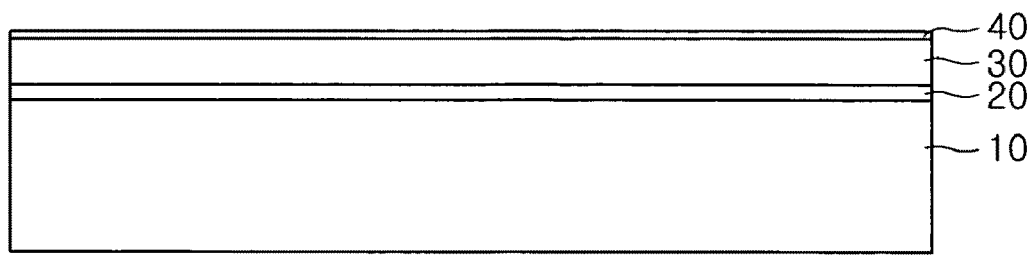
Figure 1C:
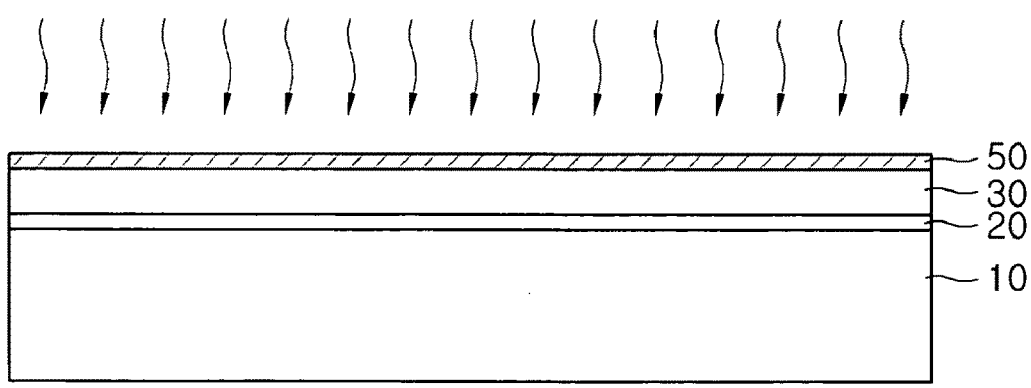

FIGS. 1A through 1C are cross-sectional views illustrating a method of forming a metal line in accordance with an exemplary embodiment;

Referring to FIG. 1A, a copper oxide (CuO) layer 20 and a copper (Cu) layer 30 are sequentially formed on a substrate 10. The substrate 10 may comprise an insulation substrate such as a plastic substrate (polyethylene, polyethersulfone, polyethylene terephthalate, polyethylene naphthalate, etc) and a glass substrate. The CuO layer 20 and the Cu layer 30 may be successively formed in the same apparatus, for example, a sputtering apparatus. Specifically, a high-purity copper target is installed in the sputtering apparatus and sputtering is then performed to form the CuO layer 20 while an oxygen gas is introduced into a chamber. Thereafter, the introduction of the oxygen gas is stopped, and sputtering is performed to form the Cu layer 30. For example, the CuO layer 20 may be formed through sputtering by introducing an argon gas and an oxygen gas. The Cu layer 30 may then be formed through sputtering by removing the presence of the oxygen gas (for example, by shutting off the introduction of the oxygen gas) but continuing the introduction of the argon gas. Here, thicknesses of the CuO layer 20 and the Cu layer 30 can be adjusted by controlling the sputtering conditions. The CuO layer 20 may be formed in layers of variable thickness—for example, a range of anywhere from approximately ⅕ to approximately 1/30 the thickness of the Cu layer 30 may be possible. Specifically, the CuO layer 20 may be formed with a thickness of approximately 1/10 the thickness of the Cu layer 30. For instance, the CuO layer 20 may have a thickness of approximately 300 Å and the Cu layer 30 may have a thickness of approximately 3,000 Å.

Referring to FIG. 1B, the substrate 10—with the CuO layer 20 and the Cu layer 30 having been formed thereon—may then be unloaded from the sputtering apparatus. Hence, the Cu layer 30 may be exposed to the normal atmosphere so that a natural oxide layer 40 is formed on the Cu layer 30. The natural oxide layer 40 has a composition of CuO or $Cu_2O$. As a thickness of the natural oxide layer 40 is increased, the resistance of the copper layer 30 is increased. Here, in one embodiment, it may be desirable to keep the exposure time of the Cu layer 30 to atmosphere as short as possible because the thickness of the natural oxide layer 40 becomes greater as the exposure time becomes longer.

Referring to FIG. 1C, the substrate 10 may then be loaded into a plasma treatment apparatus, e.g., a plasma enhanced chemical vapor deposition (PECVD) apparatus. For instance, if plasma treatment is followed by CVD process, the plasma treatment and the CVD process can be performed in the same PECVD apparatus. Thus, an additional apparatus may not be necessary to perform the plasma treatment. The PECVD apparatus may include a substrate support where the substrate 10 is mounted, a power supply configured to supply high frequency power, and a showerhead configured to receive process gases and the high frequency power from the power supply. The high frequency, e.g., 13.56 MHz, may be generated by a power supply in the range of 1.5 kW/m² to 2.5 kW/m² while the temperature and pressure of the process gases are to be controlled by the PECVD apparatus.

At the same time, a nitrogen-containing gas such as $NH_3$ gas and a silicon-containing gas such as $SiH_4$ gas are respectively introduced for plasma treatment. The nitrogen-containing gas and the silicon-containing gas are introduced in a ratio of approximately 8:1 to approximately 40:1. If the amount of the silicon-containing gas is too great, the specific resistance is increased. On the contrary, if the amount of the silicon-containing gas is too small, a blister may be produced. Therefore, the ratio of the nitrogen-containing gas to the silicon-containing gas should be appropriately controlled so as to prevent blister formation and have a desired specific resistance. The nitrogen-containing gas and the silicon-containing gas, which are supplied from the outside and introduced through the showerhead, are changed into plasma by the high-frequency power. Due to plasma, the natural oxide layer 40 on the Cu layer 30 is reduced so that it is changed into the copper layer 30.

Meanwhile, a plasma treatment layer 50 may be formed on the Cu layer 30 because of the nitrogen-containing gas and the silicon-containing gas. Here, the plasma treatment layer 50 may be a silicon nitride (SiNx) layer. The plasma treatment layer 50 is formed to a thickness ranging from approximately 50 Å to approximately 300 Å, and in some embodiments, desirably to a thickness of approximately 100 Å, by controlling process conditions such as process time, temperature, or pressure. For example, if the plasma treatment layer 50 is formed to a thickness of approximately 100 Å at a deposition rate of approximately 6.5 Å/s by introducing $NH_3$ gas and $SiH_4$ gas in a ratio of $NH_3$ gas to $SiH_4$ gas of approximately 40:1 with process temperature and pressure appropriately controlled, then a ratio of nitrogen (N) to silicon (Si) may be obtained that is approximately 1:1.18, and a ratio of N—H bond to Si—H bond that is approximately 38.5:1. Such a plasma treatment layer 50 may have a specific resistance ranging from approximately 1.7 μΩcm to approximately 2.3 μΩcm.

Although $NH_3$ gas is used as the nitrogen-containing gas in the exemplary embodiment, the present invention is not limited thereto. That is, $N_2$ gas may be used instead of $NH_3$ gas. Likewise, the silicon-containing gas may use a silicon- and hydrogen-containing gas, for example, $Si_2H_6$ gas instead of $SiH_4$ gas.

In another embodiment, the plasma treatment may be performed using a gas mixture of the silicon-containing gas and another gas as well as the nitrogen-containing gas. For instance, the plasma treatment process can be performed on the Cu layer using a hydrogen ($H_2$) gas and an argon (Ar) gas or using an Ar gas and $SiH_4$ gas. In this case, a silicon layer is formed on the Cu layer 30.

Although the exemplary embodiment illustrates that the plasma treatment layer 50 is formed on the Cu layer 30 through a plasma treatment after the CuO layer 20 and the Cu layer 30 are formed on the substrate 10, the plasma treatment layer 50 may be alternatively formed on an entire top surface of the substrate 10 through a plasma treatment after the CuO layer 20 and the Cu layer 30 are patterned.

The plasma treatment layer, i.e., the silicon nitride layer, which is obtained by performing the plasma treatment on the copper layer using the nitrogen-containing gas and the silicon-containing gas, may be formed using as little power as approximately 1/3 to 1/6 of the high frequency power required for depositing a related art silicon nitride layer for a gate dielectric in an LCD. Therefore, the silicon nitride layer formed by the plasma treatment differs in physical properties from the related art silicon nitride layer formed by a typical deposition process.

In detail, the related art silicon nitride layer is obtained by forming a first silicon nitride layer at a high deposition rate to improve productivity and then forming a second silicon nitride layer of a dense layer at a low deposition rate to improve the characteristics of a thin film transistor. In the related art silicon nitride layer, the first silicon nitride layer is formed to a thickness of 4,000 Å using a power of approximately 10 kW by introducing the nitrogen-containing gas and the silicon-containing gas at a ratio of approximately 7:1. The relate art second silicon nitride layer is formed to a thickness of 500 Å using a power of approximately 7.5 kW by introducing the nitrogen-containing gas and the silicon-containing gas at a ratio of approximately 4:1. Hence, the amount of silicon is greater than that of nitrogen in the first silicon nitride layer, whereas the amount of nitrogen is greater than that of silicon in the second nitride layer.

However, in comparison with the related art silicon nitride layer, the plasma treatment layer, i.e., the silicon nitride layer of this exemplary embodiment is formed with a power ranging from approximately 1.5 kW to approximately 2.5 kW by introducing the nitrogen-containing gas and the silicon-containing gas at a ratio of approximately 8:1 to approximately 40:1. Properties of the related art first and second silicon nitride layers and the plasma treatment layer of this exemplary embodiment are described in Table 1.

TABLE 1

| SiNx | Refractive index (at 632 nm) | Stress (E+08 dyne/cm$^2$) | Dielectric constant | Composition (N/Si) |
|---|---|---|---|---|
| First SiNx (Comparison) | 1.85-1.88 | 2.0-3.0 | 5.2-6.0 | 0.8-1.0 |
| Second SiNx (Comparison) | 1.90-1.93 | −80 to −90 | 6.5-7.3 | 1.2-1.4 |
| Plasma treatment layer (Embodiment) | 1.70-1.80 | 10-100 | 5.0-6.0 | 0.8-1.4 |

From Table 1, it can be appreciated that the plasma treatment layer of this exemplary embodiment is not denser than the related art first and second silicon nitride layers because a dielectric constant and a refractive index of the plasma treatment layer are lower than those of the related art first and second silicon nitride layers. In particular, it can also be appreciated that the plasma treatment layer significantly differs in stress from the related art first and second silicon nitride layers because the plasma treatment layer exhibits a strong tensile stress ranging from 10E+08 dyne/cm$^2$ to 100E+08 dyne/cm$^2$. In addition, the plasma treatment layer of this exemplary embodiment has a ratio of nitrogen to silicon ranging between ratios of nitrogen to silicon in the related art first and second silicon nitride layers.

The related art first and second silicon nitride layers and the plasma treatment layer, i.e., the silicon nitride layer of this exemplary embodiment, are analyzed with Fourier Transform Infrared Spectroscopy (FT-IR), of which analysis results are described in following Table 2. From Table 2, it can be appreciated that a ratio of [N—H] bond to [Si—H] bond of the silicon nitride layer formed by the plasma treatment is greater than those of the related art first and second silicon nitride layers because the silicon nitride layer formed by the plasma treatment is higher in [N—H] bond number but lower in [Si—H] bond number than the related art first and second silicon nitride layers.

TABLE 2

| SiNx | [N—H] bond number | [Si—H] bond number | [N—H]/ [Si—H] |
|---|---|---|---|
| First SiNx (Comparison) | 1.5E+22-2.0E+22 | 5.0E+21-8.0E+21 | 1.5-2.5 |
| Second SiNx (Comparison) | 2.5E+22-4.0E+22 | 1.0E+21-2.0E+21 | 20-40 |

TABLE 2-continued

| SiNx | [N—H] bond number | [Si—H] bond number | [N—H]/ [Si—H] |
|---|---|---|---|
| Plasma treatment layer (Embodiment) | 3.0E+22-4.3E+22 | 0.9E+21-1.0E+21 | 30-45 |

Recapping the results from Tables 1 and 2, it can be appreciated that the silicon nitride layer of the exemplary embodiment is not denser than the related art first and second silicon nitride layers and contains greater amount of nitrogen than silicon. This silicon nitride layer of the exemplary embodiment is formed on the copper layer through a plasma treatment using $NH_3$ gas and $SiH_4$ gas.

Figure 2A:
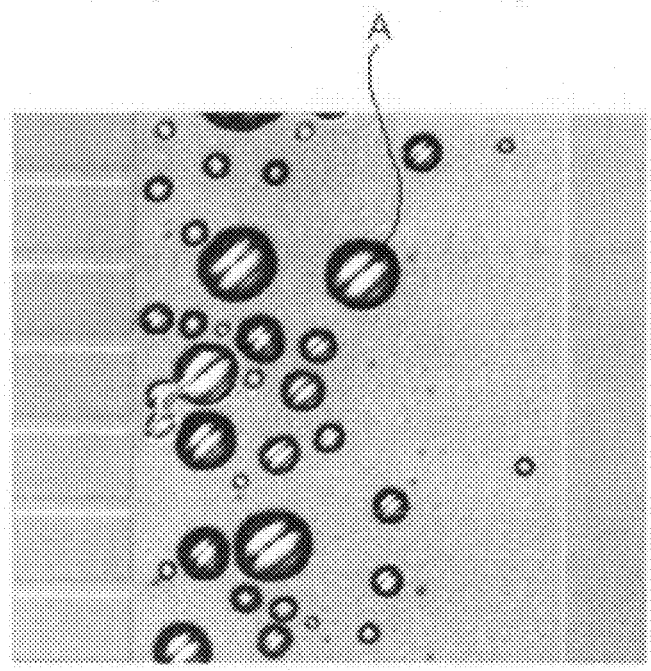
FIGS. 2A and 2B are micrographs showing plan and sectionals views of a CuO/Cu stacked structure, respectively, after performing a related art plasma treatment.
Figure 2B:
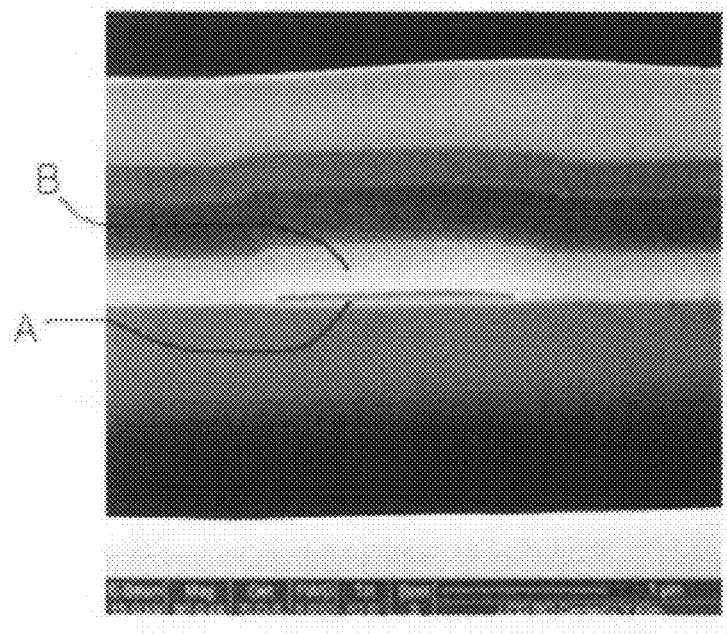
Figure 3A:
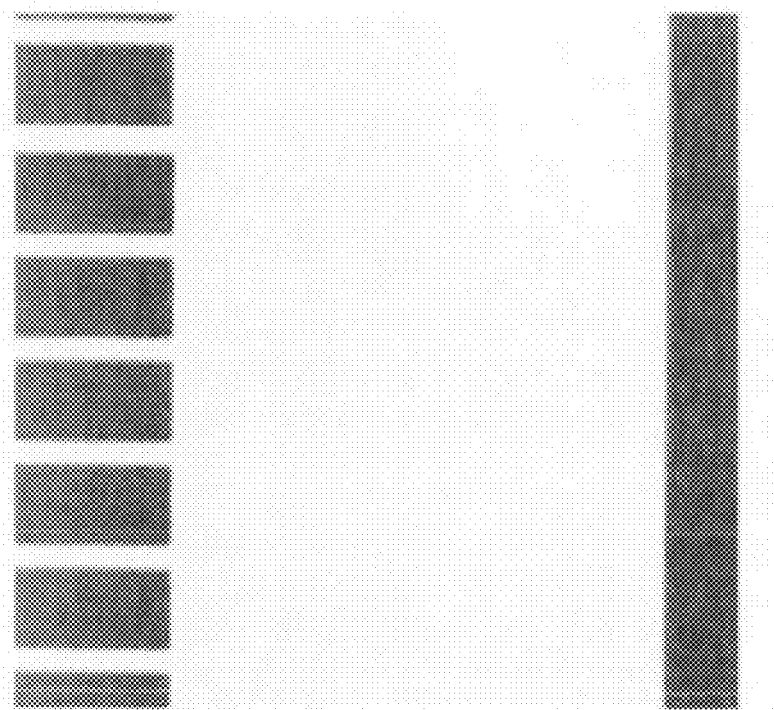
FIGS. 3A and 3B are micrographs showing plan and sectionals views of a CuO/Cu stacked structure, respectively, after performing a plasma treatment in accordance with an exemplary embodiment.
Figure 3B:
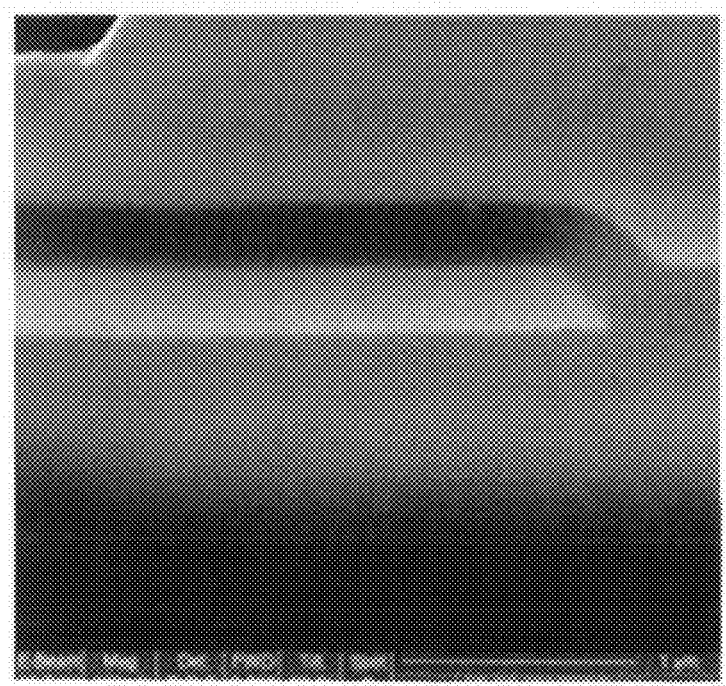

FIGS. 2A and 2B are micrographs showing plan and sectionals views of a CuO/Cu stacked structure, respectively, after performing a related art $NH_3$ plasma treatment. From FIGS. 2A and 2B, it can be observed that a blister A is produced due to the damage of the CuO layer so that a copper layer B is lifted off. In contrast, FIGS. 3A and 3B are micrographs showing plan and sectionals views of a CuO/Cu stacked structure, respectively, after performing a plasma treatment by mixing $NH_3$ gas and $SiH_4$ gas at a ratio of approximately 40:1 in accordance with an exemplary embodiment. From FIGS. 3A and 3B, it can be observed that there is no blister and thus the copper layer is not lifted off because a capping layer of SiNx formed over the copper layer prevents the CuO layer from being damaged during the plasma treatment.

Figure 4:
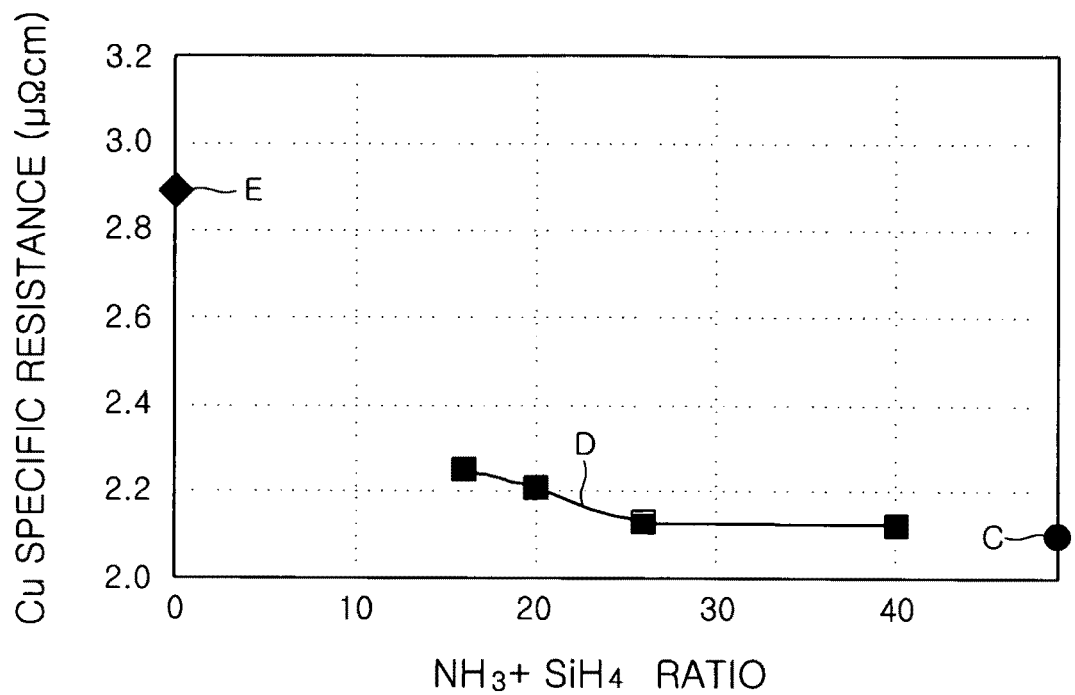
FIG. 4 is a graph illustrating distribution of specific resistance of a copper line according to plasma treatment conditions.

FIG. 4 is a graph illustrating distribution of specific resistance of a copper line according to plasma treatment conditions in a manufacturing process of an LCD. Here, a gate line was formed in a multilayered structure of CuO/Cu, and the specific resistance was measured after a gate dielectric layer, an active layer, source and drain electrodes, a passivation layer, and a pixel electrode were formed and a thermal treatment was then performed for 2 hours in nitrogen ($N_2$) ambient. As illustrated in FIG. 4, the specific resistance (D) of the copper line formed through a plasma treatment using $NH_3$ gas and $SiH_4$ gas is slightly higher than the specific resistance (C) of the copper line formed through a plasma treatment using only $NH_3$ gas, but significantly lower than the specific resistance (E) of the copper line formed without a plasma treatment. Specifically, the specific resistance (C) of the copper line formed through the plasma treatment using only $NH_3$ gas is approximately 2.1 $\mu\Omega$cm, the specific resistance (D) of the copper line formed through the plasma treatment using $NH_3$ gas and $SiH_4$ gas is in the range of approximately 2.1 $\mu\Omega$cm to approximately 2.5 $\mu\Omega$cm depending on a ratio of $NH_3/SiH_4$, and the specific resistance (E) of the copper line formed without a plasma treatment is approximately 2.89 $\mu\Omega$cm. As the ratio of $NH_3/SiH_4$ is increased, the specific resistance of copper is decreased. Specifically, if the ratio of $NH_3/SiH_4$ is 16, the specific resistance is approximately 2.25 $\mu\Omega$cm, and if the ratio of $NH_3/SiH_4$ is 40, the specific resistance is approximately 2.1 $\mu\Omega$cm.

Following Table 3 illustrates the specific resistance of the copper gate line and blister formation depending on plasma treatment conditions before formation of the gate dielectric layer of SiNx. Here, the plasma treatment of the exemplary embodiment was performed by mixing $NH_3$ gas and $SiH_4$ gas at a ratio of approximately 40:1.

TABLE 3

| Plasma treatment | Specific resistance of gate line [$\mu\Omega$cm] | Blister |
|---|---|---|
| Untreated (Comparison) | 2.89 | Not formed |
| $NH_3$ plasma treatment (Comparison) | 2.10 | Formed |
| $NH_3$ + $SiH_4$ plasma treatment (Comparison) | 2.10 | Not formed |

As shown in Table 3, if the plasma treatment is not performed, the blister is not formed but the specific resistance of the copper gate line is increased to 2.89 $\mu\Omega$cm. If the plasma treatment is performed using only $NH_3$ gas, the specific resistance of the copper gate line is low but the blister is formed. If, however, the plasma treatment is performed using $NH_3$ gas and $SiH_4$ gas, blister is not formed and the specific resistance of the copper gate line is low as well. Therefore, through the plasma treatment using $NH_3$ gas and $SiH_4$ gas in accordance with the exemplary embodiment, it is possible to prevent blister formation and reduce the specific resistance of the copper layer.

The above-described method of forming the metal line, in which the SiNx layer is formed on the copper layer by performing a plasma treatment on a multilayered structure of CuO/Cu using $NH_3$ gas and $SiH_4$ gas, is applicable to a process of forming at least one of a gate line and a data line in an LCD, thereby reducing line resistance while preventing blister formation. A lower substrate of an LCD formed using the above-described method of forming the metal line will be described below.

Figure 5:
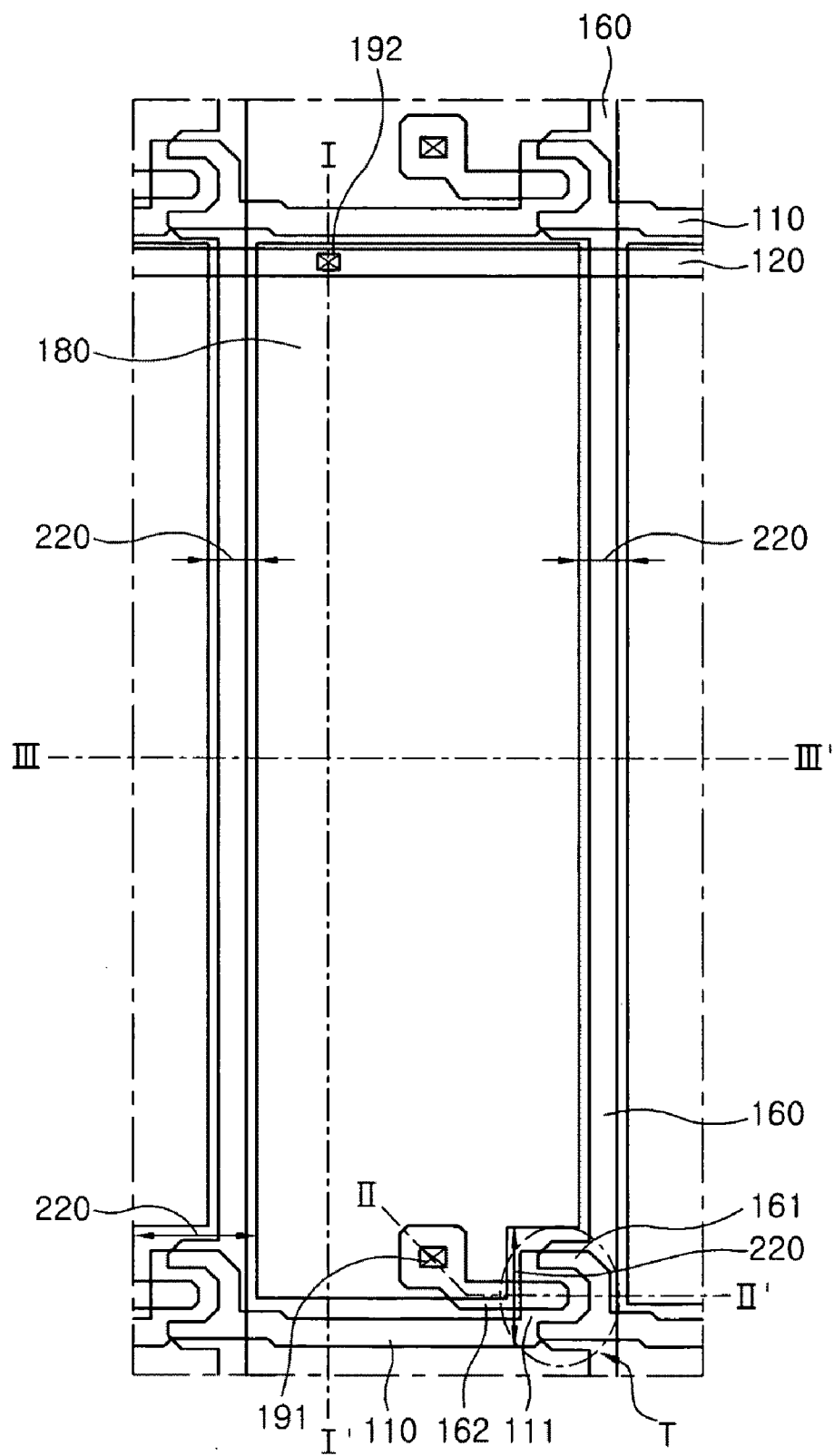
FIG. 5 is a plan view of a liquid crystal display (LCD) in accordance with another exemplary embodiment.
Figure 6:
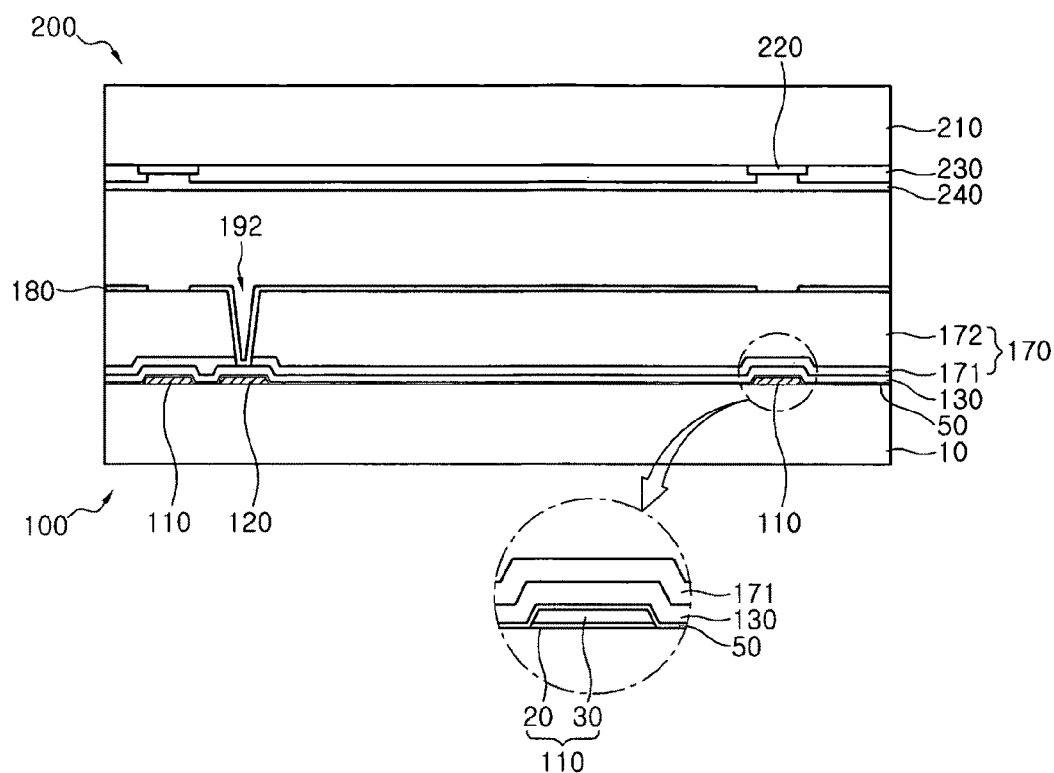
FIG. 6 is a cross-sectional view taken along line I-I' of FIG. 5.
Figure 7:
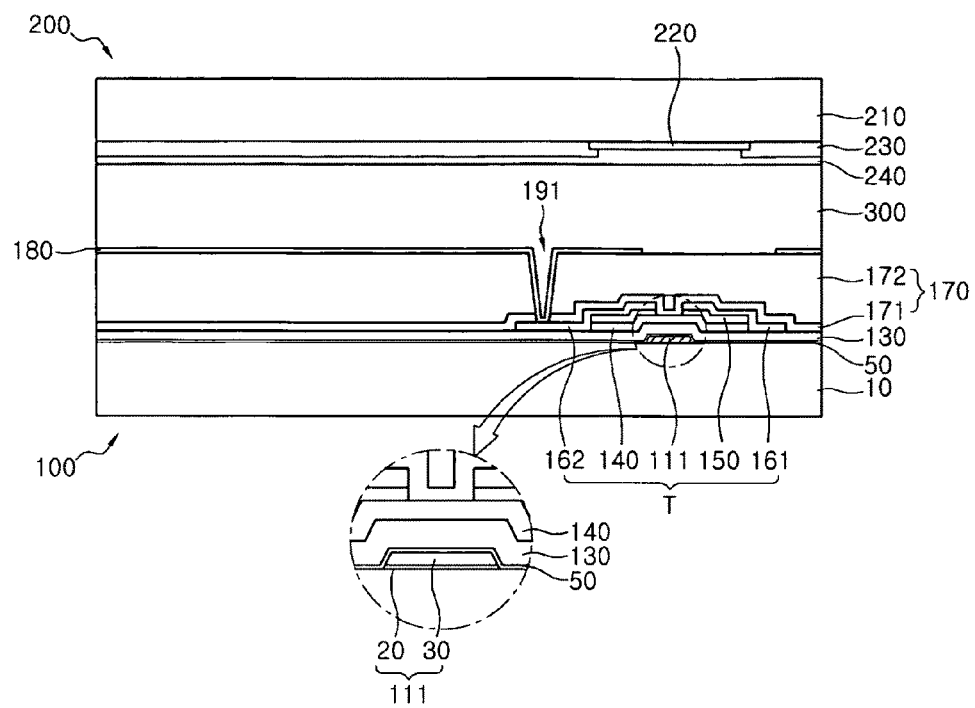
FIG. 7 is a cross-sectional view taken along line II-II' of FIG. 5.
Figure 8:
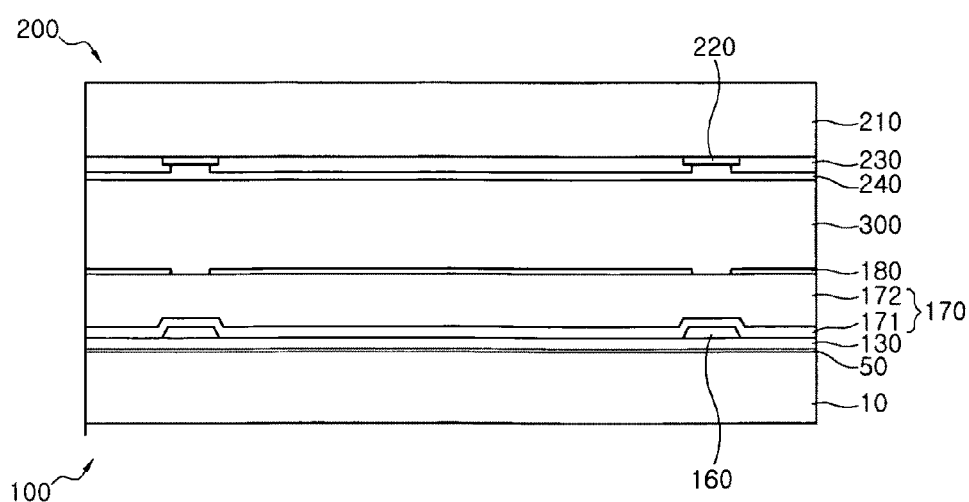
FIG. 8 is a cross-sectional view taken along line III-III' of FIG. 5.

FIG. 5 is a plan view of an LCD in accordance with another exemplary embodiment. FIGS. 6 through 8 are cross-sectional views taken along lines I-I', II-II' and III-III' of FIG. 5, respectively. Particularly, FIGS. 5 through 8 illustrate an LCD including a lower substrate where a gate line is formed by performing a plasma treatment on a multilayered structure of CuO/Cu using both $NH_3$ gas and $SiH_4$ gas.

Referring to FIGS. 5 through 8, the LCD includes a lower substrate 100 having a gate line 110, a data line 160, a passivation layer 170 and a pixel electrode 180, an upper substrate 200 having a color filter 230 and a common electrode 240, and a liquid crystal layer 300 disposed between the lower and upper substrates 100 and 200.

The lower substrate 100 includes a plurality of gate lines 110, a plasma treatment layer 50 disposed over the substrate 10 including the gate line 110, a plurality of data lines 160, a passivation layer disposed over the data line 160, a pixel electrode 180 disposed over the passivation layer 170, and a TFT (T) connected to the gate line 110, the data line 160 and the pixel electrode 180. The plurality of gate lines 110 extend in one direction over the substrate 10, and are separated from each other by a predetermined distance. The gate line 110 has a multilayered structure of a CuO layer 20 and a copper layer 30. The plurality of data lines 160 extend in another direction crossing the gate lines 110 and are separated from each other by a predetermined distance. The data lines 160 are insulated from the gate lines 110 by an insulation layer 171 and a gate dielectric layer 130. Herein, the data line 160 may also have the multilayered structure of the CuO layer 20 and the copper layer 30, and the plasma treatment layer 50 may be formed on the gate dielectric layer 130 including the data line 160.

The gate line 110 extends in one direction, for example, a horizontal direction. A portion of the gate line 110 protrudes upwardly or downwardly to form a gate electrode 111. The gate line has a multilayered structure of the CuO layer 20 and the Cu layer 30. The CuO layer 20 is formed with a thickness of approximately ⅕ to approximately ⅟₃₀ the thickness of the Cu layer 30. Specifically, the CuO layer 20 may be formed with a thickness of approximately ⅟₁₀ the thickness of the Cu layer 30. For instance, the CuO layer 20 may have a thickness ranging from approximately 100 Å to approximately 1,000 Å, and the Cu layer 30 may have a thickness ranging from approximately 300 Å to 10,000 Å. Desirably, the CuO layer 20 has a thickness of approximately 300 Å, and the Cu layer 30 has a thickness of approximately 3,000 Å. The CuO layer 20 and the Cu layer 30 are sequentially formed through sputtering process in the same apparatus. The gate line 110 may have predetermined rugged patterns.

A storage electrode line 120 may be further provided such that it is spaced apart from the gate line 110. The storage electrode line 120 is parallely disposed between two gate lines 110. The storage electrode line 120 may be disposed in the center of a region between the gate lines 110, or disposed close to one of the two gate lines 110. In addition, the storage electrode line 120 may be formed through the same process as the gate line 110 and have the same thickness as the gate line 110. Further, the storage electrode line 120 may have a width that is equal to or different from the width of the gate line 110. The storage electrode line 120 forms a storage capacitor together with the pixel electrode 180 with the gate dielectric layer 130 interposed therebetween.

The plasma treatment layer 50 is formed over the substrate 100 including the gate line 110 and the storage electrode line 120. The plasma treatment layer 50 may have a thickness of approximately ⅙ to approximately ¼ the thickness (i.e. approximately the same thickness) of the CuO layer 20. For example, the CuO layer 20 has a thickness ranging from approximately 100 Å to approximately 1,000 Å, and the plasma treatment layer 50 has a thickness ranging from approximately 15 Å to approximately 1,000 Å.

The plasma treatment layer 50 is formed through a plasma treatment using a nitrogen-containing gas and a silicon-containing gas. Hence, the plasma treatment layer 50 becomes a silicon nitride layer. The nitrogen-containing gas includes $NH_3$ gas or the like, and the silicon-containing gas includes $SiH_4$ gas or the like. During the plasma treatment, the nitrogen-containing gas and the silicon-containing gas are introduced at a ratio of approximately 8:1 to approximately 40:1. The plasma treatment process may be performed by mixing the $SiH_4$ gas with a hydrogen or argon gas as well as the nitrogen-containing gas. In this case, the plasma treatment layer becomes a silicon layer.

The gate dielectric layer 130 is formed on the plasma treatment layer 50. The gate dielectric layer 130 may be formed of an inorganic insulation material such as silicon oxide ($SiO_2$) and silicon nitride. Desirably, the gate dielectric layer 130 is formed of silicon nitride. The gate dielectric layer may have a monolayered structure. The gate dielectric layer 130 may be formed using a CVD method, e.g., a PECVD method. If the gate dielectric layer 130 is formed of silicon nitride, the gate dielectric layer 130 is formed by introducing a nitrogen-containing gas and a silicon-containing gas at a ratio of approximately 7:1. Hence, the amount of silicon is greater than that of nitrogen in the gate dielectric layer 130. The gate dielectric layer 130 may be a silicon nitride layer having the refractive index in the range of 1.85 to 1.88 at 632 nm, the stress in the range of 2.0E+08 dyne/cm² to 3.0E+08 dyne/cm², the dielectric constant in the range of 5.2 to 6.0, and the nitrogen/silicon ratio in the range of 0.8 to 1.0.

An active layer 140 formed of a first semiconductor material is formed on the gate dielectric layer 130 over the gate electrode 111, and an ohmic contact layer 150 formed of a second conductive material is formed on the active layer 140. Here, the first conductive material may comprise amorphous silicon, and the second semiconductor material may comprise silicide or n+ hydrogenated amorphous silicon where n-type impurities are heavily doped.

The data line 160 extends in a direction crossing the gate line 110, for example, in a longitudinal direction. A portion of the data line 160 protrudes to form a source electrode 161. A drain electrode 162 is separated from the source electrode 161 by a predetermined distance. The data line 160 including the source and drain electrodes 161 and 162 may be formed of a material used to form the gate line 110 and the storage electrode line 120. Further, the data line 160 may have a monolayered or multilayered structure. For example, the data line may have a multilayered structure of a CuO layer and a Cu layer, and a plasma treatment layer may be formed on the gate dielectric layer 130 through a plasma treatment. The data line may have predetermined rugged patterns.

The TFT (T) provides a pixel signal applied to the data line 160 to the pixel electrode 180 in response to a signal applied to the gate line 110. Therefore, the TFT (T) includes the gate electrode 111 connected to the gate line 110, the source electrode connected to the data line 160, the drain electrode 162 connected to the pixel electrode 180, the gate dielectric layer 130, the active layer 140 and the ohmic contact layer 150. Herein, the gate dielectric layer 130, the active layer 140 and the ohmic contact layer 150 are sequentially formed between the gate electrode 111 and the source and drain electrodes 161 and 162. The ohmic contact layer 150 may be provided on the gate dielectric layer 130 except for a channel region.

On the TFT (T) and the data line 160, the passivation layer 170 is formed of an organic material with good planarization property and photosensitivity, or an inorganic material such as silicon nitride and low-dielectric-constant material formed through PECVD. The passivation layer 170 may include a first insulation layer with a small thickness formed of silicon nitride or silicon oxide, and a second insulation layer 172 with a great thickness formed of an organic insulation material. Of course, a color filter may be formed instead of the second insulation layer 172, thereby achieving an LCD panel having a color filter on array (COA) structure.

The passivation layer 170 is partially removed to form a first contact hole 191 exposing the drain electrode 162, and to form a second contact hole 192 exposing the gate dielectric layer 130 on the storage electrode line 120.

The pixel electrode 180 is formed on the passivation layer 170, and connected to the drain electrode 162 through the first contact hole 191. The pixel electrode 180 forms a storage capacitor with the storage electrode line 120 with the gate dielectric layer 130 interposed there between.

The pixel electrode 180 may have cutouts (not shown) as a domain control unit so as to control the orientation of liquid crystal molecules. Instead of the cutouts (not shown), the pixel electrode 180 may have protrusions as the domain control unit. The cutouts (not shown) of the pixel electrode 180 may divide the liquid crystal layer into a plurality of domains together with cutouts (not shown) of a common electrode 240 to be described later.

The upper substrate 200 includes a black matrix 220 selectively provided on a second insulation substrate 210, a color filter 230 disposed between the black matrices 220, and a common electrode 240 disposed over an entire structure.

The black matrix 220 is disposed between pixel regions, and prevents light leakage into other regions than the pixel region and also prevents light interference between adjacent pixel regions. The black matrix 220 is formed of a photosensitive organic material with black pigment added. The black pigment may include carbon black or titanium oxide. Alternatively, the black matrix 220 may be formed of a metallic material such as Cr and CrOx.

The red (R), green (G) and blue (B) color filters 230 are repetitively arranged with the black matrices 220 interposed there between. The color filter 230 serves a role of realizing an image of desired color by filtering the light, which is emitted from a light source and passes through the liquid crystal layer 300. The color filter 330 may be formed of a photosensitive organic material.

The common electrode 240 may be formed of a transparent conductive material, e.g., indium tin oxide (ITO) or indium zinc oxide (IZO), and provided on the black matrix 220 and the color filter 230. The common electrode 240 applies a voltage to the liquid crystal layer 300 together with the pixel electrode 180 of the lower substrate 100. The common electrode 240 may have cutouts (not shown) that divide the liquid crystal layer into a plurality of domains together with the cutouts (not shown) of the pixel electrode 180.

Although, in the exemplary embodiments, the plasma treatment layer 50 is formed through a plasma treatment after the CuO layer 20 and the Cu layer 30 are patterned to form the gate line 110, the present invention is not limited thereto. That is, the gate line 10 may be formed in such a way that the CuO layer 20 and the Cu layer 30 are formed, a plasma treatment is performed to form the plasma treatment layer 50 on the Cu layer 30, and patterning is performed.

The metal line and the method of forming the same may be applicable to a various displays in addition to an LCD, and also applicable to a manufacturing process of a semiconductor device.

In accordance with the exemplary embodiments, to prevent an increase in resistance of a multilayered metal line of copper oxide/copper layers, a plasma treatment process is performed with a silicon-containing gas added. For example, the plasma treatment is performed using a nitrogen-containing gas or a silicon-containing gas. Alternatively, the plasma treatment is performed using a hydrogen or argon gas and the silicon-containing gas. Accordingly, a plasma treatment layer such as a SiNx or Si layer is thinly formed on the copper layer, thereby preventing an increase in resistance of the copper layer and also preventing blister formation caused by the damage of a copper oxide layer. Consequently, it is possible to improve the reliability of a copper line and thus enhance the reliability of a device.

Furthermore, because a gate dielectric layer may not be formed in a bilayered structure for employing a low resistance copper line, it is possible to simplify a process of forming the gate dielectric layer, increase process margin and improve productivity.

Although the a method of forming the same, and a display using the same have been described with reference to the specific embodiments, they are not limited thereto. Therefore, it will be readily understood by those skilled in the art that various modifications and changes can be made thereto without departing from the spirit and scope of the present invention defined by the appended claims.

What is claimed is:

1. A metal line comprising:
    a copper oxide layer and a copper layer, which are stacked in sequence; and
    a plasma treatment layer having a refractive index less than or equal to 1.8 at 632 nm, the plasma treatment layer formed on the copper layer through a plasma treatment using a process gas including a silicon-containing gas.

2. The metal line of claim 1, wherein the plasma treatment layer comprises at least one of a silicon nitride layer and a silicon layer.

3. The metal line of claim 2, wherein the plasma treatment layer comprises a silicon nitride layer, and the silicon nitride layer has a refractive index ranging from approximately 1.70 to approximately 1.80, and a dielectric constant ranging from approximately 5.0 to approximately 6.0.

4. The metal line of claim 2, wherein the plasma treatment layer comprises a silicon nitride layer, and the silicon nitride layer has a ratio of nitrogen to silicon ranging from approximately 0.8 to approximately 1.4, and a ratio of N—H bond to Si—H bond ranging from approximately 30 to approximately 45.

5. The metal line of claim 1, wherein the metal line has a specific resistance ranging from approximately 1.7 $\mu\Omega$cm to approximately 2.3 $\mu\Omega$cm.

6. The metal line of claim 1, wherein the copper oxide layer has a thickness of approximately 1/10 to approximately 1/30 the thickness of the copper layer, and the plasma treatment layer has a thickness of approximately 1/6 to approximately 1/1 the thickness of the copper oxide layer.

7. A method of forming a metal line, the method comprising:
    forming a copper oxide layer and a copper layer on a substrate sequentially; and
    forming a plasma treatment layer on the copper layer through a plasma treatment using a process gas including a silicon-containing gas, the plasma treatment layer having a refractive index less than or equal to 1.8 at 632 nm.

8. The method of claim 7, wherein the copper oxide layer and the copper layer are successively formed in the same apparatus.

9. The method of claim 8, wherein the plasma treatment layer comprises at least one of a silicon nitride layer and a silicon layer.

10. The method of claim 9, wherein the plasma treatment layer comprises a silicon nitride layer, and the silicon nitride layer is formed by a plasma treatment using a nitrogen-containing gas and a silicon-containing gas.

11. The method of claim 10, wherein the nitrogen-containing gas and the silicon-containing gas are introduced at a ratio of approximately 8:1 to approximately 40:1.

12. The method of claim 9, wherein the plasma treatment layer comprises a silicon layer, and the silicon layer is formed by a plasma treatment using a hydrogen or argon gas and a silicon-containing gas.

13. A display comprising:
    a plurality of gate lines extending in one direction over a substrate, and comprising a copper oxide layer and a copper layer stacked in sequence;
    a plasma treatment layer and a gate dielectric layer provided over the substrate including the gate lines, the plasma treatment layer having a refractive index less than or equal to 1.8 at 632 nm;
    a plurality of data lines extending in another direction crossing the gate lines; and
    a pixel electrode electrically connected to the gate line and the data line.

14. The display of claim 13, wherein the plasma treatment layer comprises at least one of a silicon nitride layer and a silicon layer.

15. The display of claim 14, wherein the plasma treatment layer comprises a silicon nitride layer, and the silicon nitride layer has a refractive index ranging from approximately 1.70 to approximately 1.80, and a dielectric constant ranging from approximately 5.0 to approximately 6.0.

16. The display of claim 14, wherein the plasma treatment layer comprises a silicon nitride layer, and the silicon nitride layer has a ratio of nitrogen to silicon ranging from approximately 0.8 to approximately 1.4, and a ratio of N—H bond to Si—H bond ranging from approximately 30 to approximately 45.

17. The display of claim 14, wherein the metal line has a specific resistance ranging from approximately 1.7 μΩcm to approximately 2.3 μΩcm.

* * * * *